United States Patent [19]

Kubota et al.

[11] Patent Number: 5,309,758
[45] Date of Patent: May 10, 1994

[54] STEERING ANGLE SENSOR FOR AUTOMOBILE

[75] Inventors: Hajime Kubota; Atsushi Makino; Nobuyuki Tanaka; Kazuto Chisaka; Masaru Abe, all of Saitama, Japan

[73] Assignee: Honda Giken Kogyo Kabushiki Kaisha, Tokyo, Japan

[21] Appl. No.: 860,135

[22] Filed: Mar. 30, 1992

[30] Foreign Application Priority Data

Apr. 25, 1991 [JP] Japan .................................. 3-095614

[51] Int. Cl.$^5$ .......................................... G01M 19/00
[52] U.S. Cl. .................................. 73/118.1; 29/400.1
[58] Field of Search ...................... 73/118.1; 180/79.1, 180/79.3; 29/400.1

[56] References Cited

U.S. PATENT DOCUMENTS 5,123,279  6/1992  Henein et al. ........................ 73/118.1

*Primary Examiner*—Jerry W. Myracle
*Attorney, Agent, or Firm*—Irving M. Weiner; Joseph P. Carrier; Pamela S. Burt

[57] ABSTRACT

A stator of a steering angle sensor is fixed to a steering column through a combination switch case and a stationary bracket, and a rotor of the sensor is rotatably fitted over a steering shaft. A locking collar is slidably but nonrotatably connected to the rotor. The locking collar and the stator are respectively provided with a locking groove and a locking tooth which engage each other to lock the rotor in a predetermined rotational alignment. When the steering angle sensor is not mounted to a vehicle, the locking groove and the locking tooth are brought into engagement with each other by a locking spring to lock the rotor. When a steering wheel is mounted to the steering shaft in a predetermined rotational neutral position of the steering shaft, a clamping pressure caused by the mounting causes the locking collar to be moved to a lockreleasing position or disengage position and the rotor is connected to the steering shaft. In this manner, the rotational neutral position of the rotor in the steering angle sensor can be easily and accurately aligned with the rotational neutral position of the steering shaft so that a signal corresponding to a rotational angle of the steering shaft from the rotational neutral position, i.e., corresponding to a steering angle, can be detected by a pickup of the stator.

19 Claims, 6 Drawing Sheets

STEERING ANGLE SENSOR FOR AUTOMOBILE

BACKGROUND OF THE INVENTION

1. Field of the Invention

The present invention relates to steering angle sensors for automobiles for detecting the rotational angle of a steering shaft from a rotational neutral position, more particularly, the improvements comprise a stator supported on a steering column fixed to a vehicle body and a rotor mounted to a steering shaft rotatably carried in the steering column, the stator having a pickup means provided thereon for detecting the rotational angle of the rotor from a predetermined rotational neutral position thereof.

2. Description of the Prior Art

A known steering angle sensor is disclosed, for example, in Japanese Patent Application Laid-open Publication No. 18707/85. When a steering angle sensor is mounted on an automobile, an error may be produced between the rotational angle of the steering shaft from the neutral position, i.e., the steering angle and the rotational angle of the rotor detected by the pickup of the stator, unless the neutral position of the rotor of the sensor is aligned with the neutral position of the steering wheel. However, it is extremely difficult to provide an exact alignment of the neutral positions of the rotor and steering wheel during vehicle assembly.

SUMMARY OF THE INVENTION

The present invention may suitably comprise, consist of or consist essentially of a steering angle sensor having a stator supported on a steering column fixed to a vehicle body and a rotor mounted to a steering shaft rotatably carried in the steering column. The stator includes a pickup means provided thereon for detecting the rotational angle of the rotor from a predetermined rotational neutral position thereof. The sensor further includes a locking means which is adapted to lock the rotor with respect to the vehicle body in a neutral position when the steering wheel is not mounted to the steering shaft, the locking means is adapted to release the rotor and to connect the rotor to the steering shaft in a direction of rotation of the steering shaft by mounting the steering wheel to the steering shaft.

In the preferred embodiment of the present invention, the neutral position of the rotor can accurately be aligned with the neutral position of the steering shaft by an extremely simple operation comprising first setting the steering angle sensor on the steering column and the steering shaft in a condition that the rotor has been locked in the predetermined rotational neutral position, and then mounting the steering wheel to the steering shaft in its rotational neutral position. Therefore, a signal corresponding to a steering angle of the steering shaft can correctly be received from the pickup of the steering angle sensor.

Accordingly, it is an object of the present invention to provide a steering angle sensor of the type described above for an automobile, wherein the neutral position of the rotor can easily and accurately be aligned with the neutral position of the steering shaft.

The above and other objects, features and advantages of the invention will become apparent from the following description of the preferred embodiments, when read in conjunction with the accompanying drawings.

DESCRIPTION OF THE PREFERRED EMBODIMENTS

The present invention will now be described by way of a preferred embodiment in connection with the accompanying drawings. In the description, the terms "front" and "rear" refer to the longitudinal direction of a vehicle body.

Figure 1:
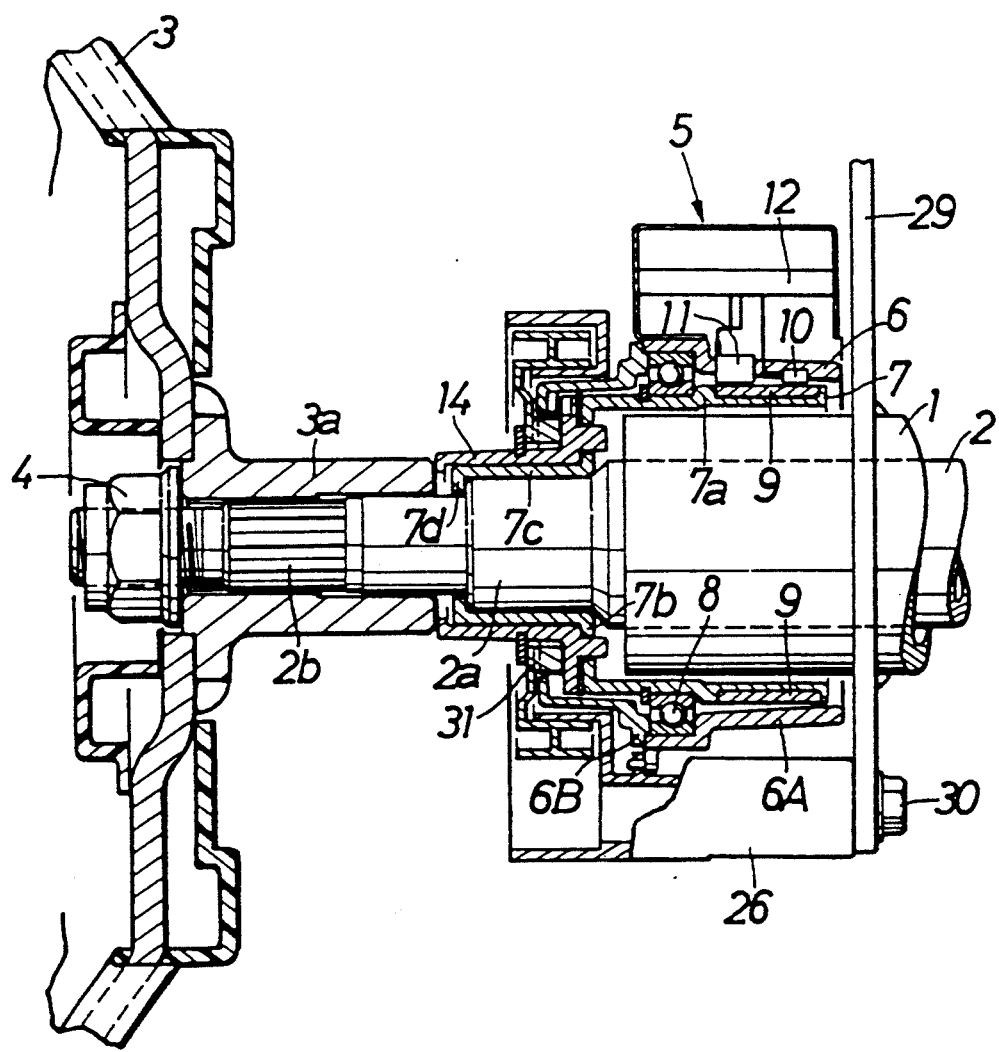
FIG. 1 illustrates a longitudinal sectional side view of a steering wheel and its related portions of an automobile with a steering angle sensor according to the present invention mounted thereon.

Referring first to FIG. 1, a steering shaft 2 is rotatably carried in a steering column 1 fixed to a vehicle body of an automobile. The steering shaft 2 includes a sensor attaching shaft portion 2a provided at a rear end of the shaft 2 projecting from the steering column 1 and a serration shaft portion 2b extending rearwardly toward the passenger compartment having a diameter smaller than that of the sensor-mounting shaft portion 2a. A boss 3a of a steering wheel 3 is fitted over the serration shaft portion 2b and secured by a nut 4. A front end of the steering shaft 2 is connected to a steering mechanism (not shown) for front wheels, as is well known in the art.

A steering angle sensor 5 according to the present invention is mounted to the steering column 1 and the sensor-mounting shaft portion 2a by utilizing the clamping force of boss 3a of the steering wheel 3.

Figure 2:
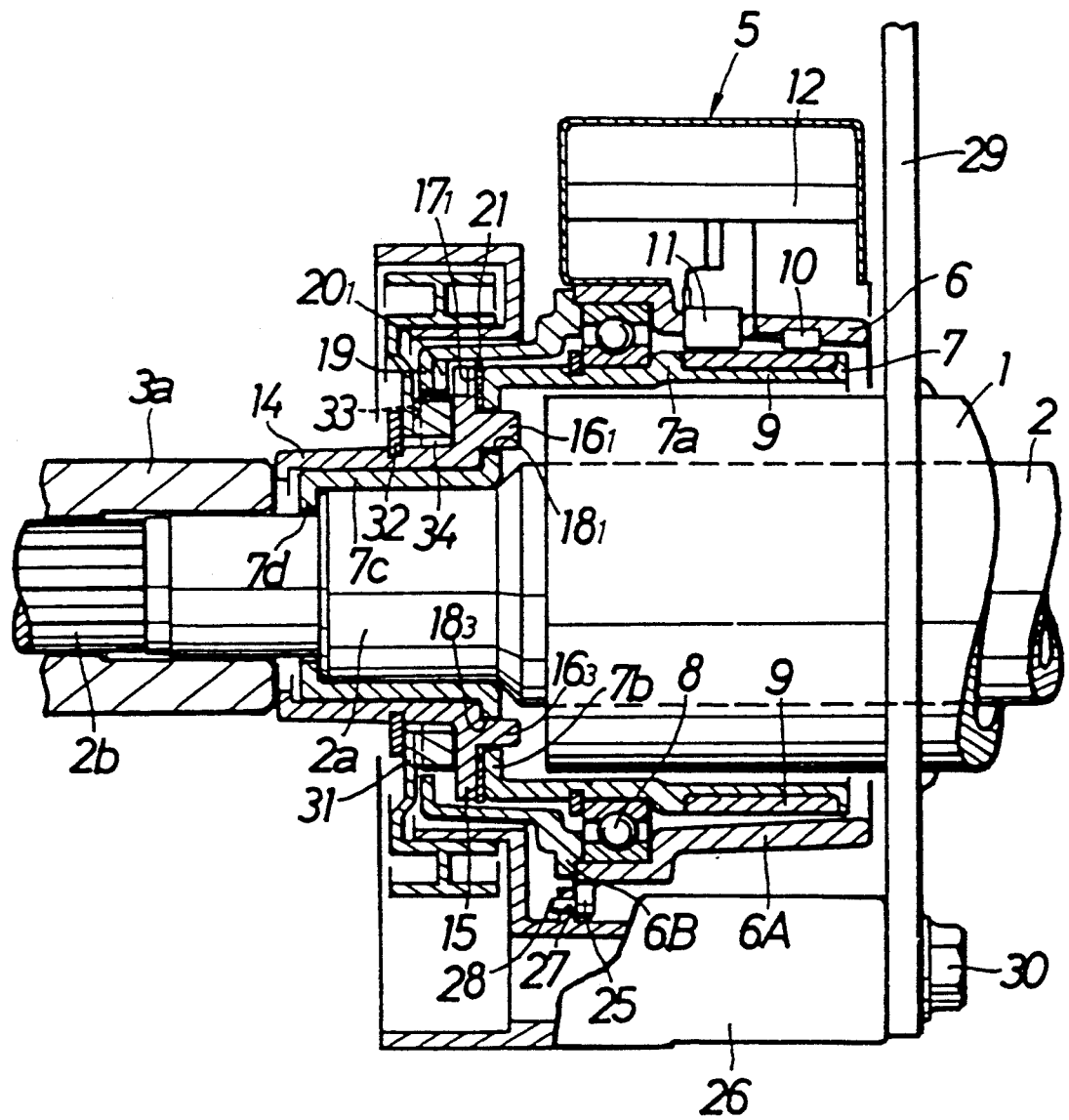
FIG. 2 illustrates an enlarged view of an essential portion shown in FIG. 1.
Figure 3:
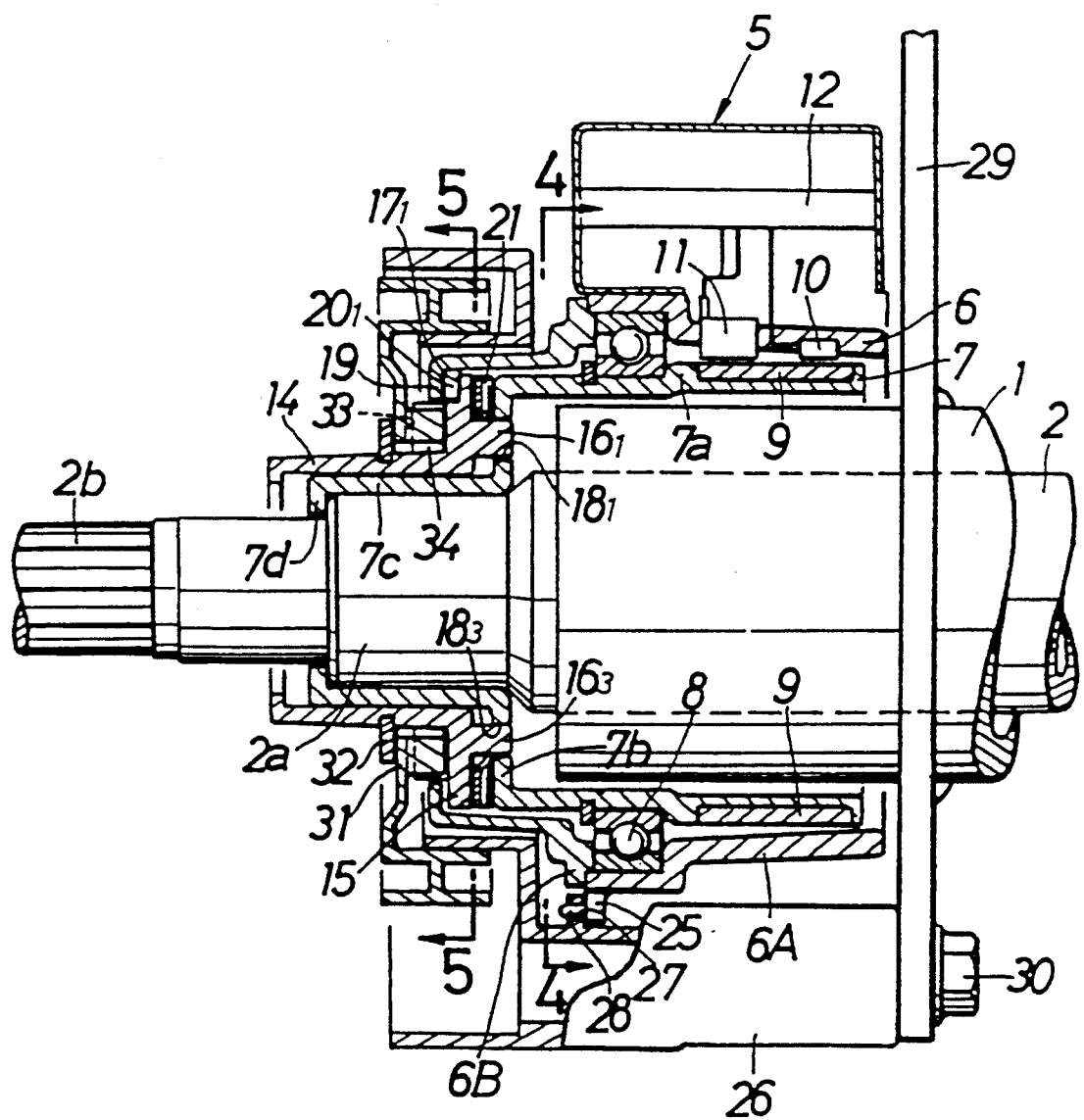
FIG. 3 illustrates a sectional view similar to FIG. 2 showing a neutral locked state of the steering sensor prior to mounting of the steering wheel.

FIGS. 2 and 3 show longitudinal sectional side view of the steering angle sensor 5 with the steering wheel 3 mounted thereto and prior to mounting of the steering wheel 3, respectively. Referring to these figures, the steering angle sensor 5 includes a cylindrical stator 6, and a rotor 7 rotatably and axially immovably connected to the stator 6 through a ball bearing 8. A large number of permanent magnets 9 are embedded in an outer peripheral surface of the rotor 7 in a circumferential arrangement with their magnetic poles alternately reversed. The stator 6 is provided with a first pickup 10 for detecting the approach of a particular one of the magnets 9 at a predetermined neutral position of the rotor 7. A second pickup 11 is provided for detecting a counterclockwise or clockwise rotational angle from the passage situation of the magnets 9. After the first pickup 10 has detected the rotational neutral position of the rotor 7 an electronic circuit 12 processes output signals from both the pickups 10 and 11. Thus, if the rotor 7 is secured to the steering shaft 2 with the neutral positions aligned, an output signal corresponding to a counterclockwise or clockwise rotational angle of the steering shaft 2 from the rotational neutral position, i.e., a steering angle, can be detected by the second pickup 11. Therefore, the pickups 10 and 11 form the pickup means of the present invention.

The rotor 7 includes an intermediate wall portion 7b extending radially inwardly from a rear end of a main cylindrical portion 7a carried directly on the ball bearing 8, a cylindrical mounting portion 7c extending rearwardly from the intermediate wall portion 2a, and a collar portion 7d bent radially inwardly from a rear end of the cylindrical mounting portion 7c.

A locking collar 14 acts as a locking means or a locking member which is slidably fitted over an outer periphery of the cylindrical mounting portion 7c. The locking collar 14 has an outwardly-directed flange 15 opposed to the intermediate wall portion 7b. A plurality of connecting pins $16_1$ to $16_4$ (four in the illustrated embodiment) (best seen in FIG. 5) are provided on a front surface of the outwardly-directed flange 15 to project therefrom, and a plurality of locking grooves (three in the illustrated embodiment) $17_1$ to $17_3$ (best seen in FIGS. 5 and 6) are provided in a rear surface of the flange 15. The connecting pins $16_1$ to $16_4$ are slidably received into pin holes $18_1$ to $18_4$ provided in the intermediate wall portion 7b.

The stator 6 has an inwardly-directed flange 19 opposed to the front surface of the outwardly-directed flange 15. Locking teeth $20_1$ to $20_3$ are formed on the inwardly-directed flange 19 and adapted to be engaged with and disengaged from the locking grooves $17_1$ to $17_3$.

Figure 5:
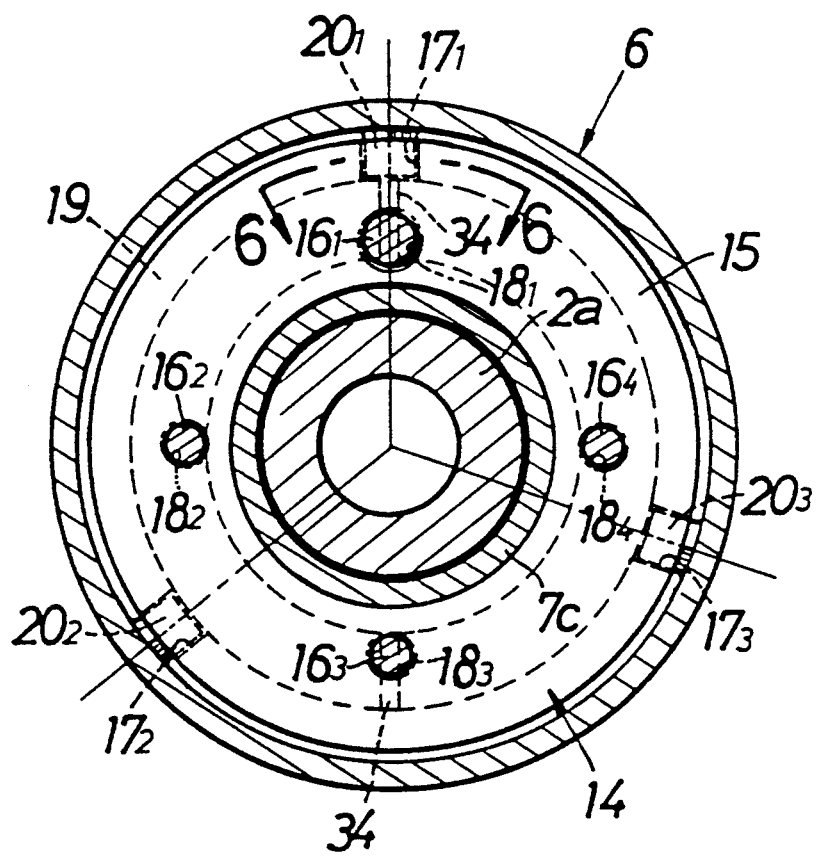
FIG. 5 illustrates a sectional view taken along a line 5—5 in FIG. 3.

As is shown in FIG. 5, the connecting pins $16_1$ to $16_4$ and the pin holes $18_1$ to $18_4$ are circumferentially arranged at equal distances in the outwardly-directed flange 15 and the intermediate wall portion 7b, respectively. One of the connecting pins $16_1$ is formed larger in diameter than those of the other connecting pins, and one of the pin holes $18_1$ is also formed larger in diameter than those of the other pin holes. By defining the fitting companions or mates of the connecting pins $16_1$ to $16_4$ and the pin holes $18_1$ to $18_4$ in this manner, the rotor 7 and the locking collar 14 are interconnected in a predetermined rotational position.

Figure 6:
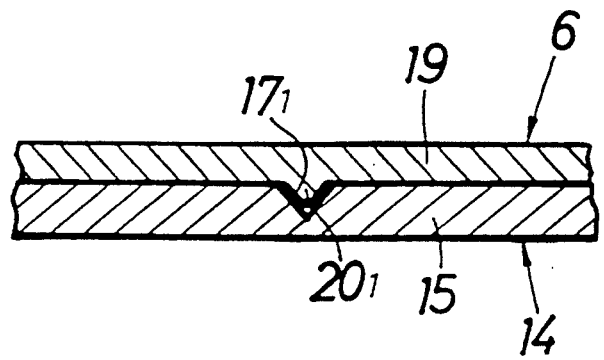
FIG. 6 illustrates a sectional view taken along a line 6—6 in FIG. 5.

As shown in FIGS. 5 and 6, the locking grooves $17_1$ to $17_3$ and the locking teeth $20_1$ to $20_3$ are circumferentially arranged at predetermined unequal distances in the outwardly-directed flange 15 and the inwardly-directed flange 19. Each of the locking grooves and each of the locking teeth are substantially V-shaped when viewed in section. Thus, the locking grooves $17_1$ to $17_3$ and the locking teeth $20_1$ to $20_3$ are engagable with each other only in a predetermined rotational neutral position.

Figure 7:
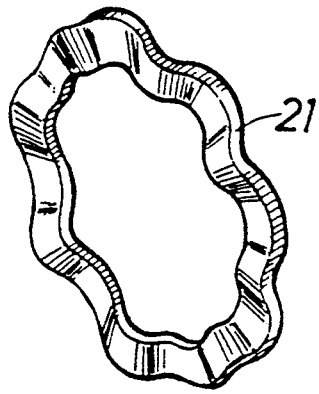
FIG. 7 illustrates a perspective view of a locking spring in the steering angle sensor.

A corrugated locking spring 21 (best seen in FIG. 7) is interposed between the intermediate wall portion 7b and the outwardly-directed flange 15 for biasing the outwardly-directed flange 15 in a direction to permit the locking grooves $17_1$ to $17_3$ and the locking teeth $20_1$ to $20_3$ to interlock or engage with each other. If the outwardly directed flange 15 is moved toward the intermediate wall portion 7b by compressing the locking spring 21, the locking grooves $17_1$ to $17_3$ and the locking teeth $20_1$ to $20_3$ are disengaged.

Figure 4:
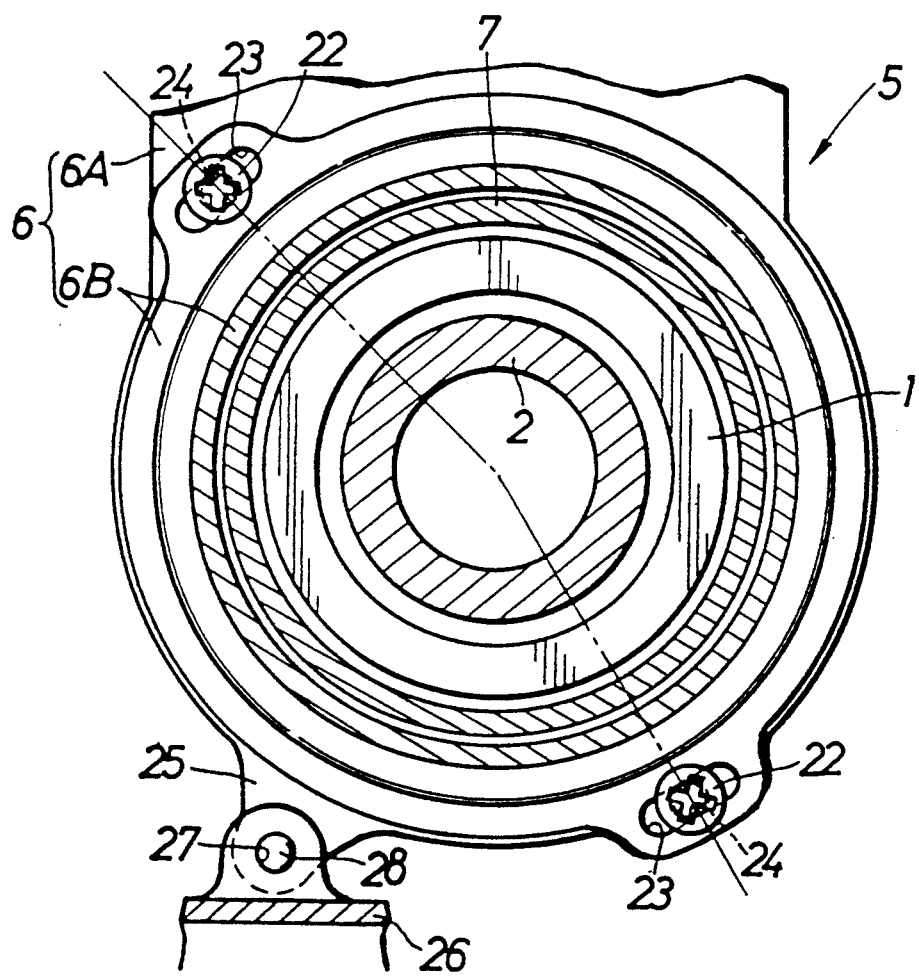
FIG. 4 illustrates a sectional view taken along a line 4—4 in FIG. 3.

The stator 6 is divided into a first cylindrical portion 6A having the first and second pickups 10 and 11 and the electronic circuit 12, and a second cylindrical portion 6B having the locking teeth $20_1$ to $20_3$. The first cylindrical portion 6A is relatively rotatably fitted over the second cylindrical portion 6B such that a radially inner edge of a rear end portion of the first portion 6A is abutted, in both radial and axial directions, against a step portion formed around an entire outer side surface of a front end portion of the second portion 6B. Both portions 6A and 6B are coupled by a pair of machine screws 22. More specifically, as best seen in FIG. 4, the first portion 6A is provided with a pair of elongated holes 23 extended in a circumferential direction of the portion 6A, and the second portion 6B is provided with a pair of threaded bores 24. The machine screws 22 passed through the elongated holes 23 are fitted into and tightened in the threaded bores 24, thereby coupling the portion 6A and 6B. In this case, an outer race of the ball bearing 8 is clamped between the portion 6A and 6B.

The pair of elongated holes 23 and the pair of threaded bores 24 are disposed on different diametric lines of the stator 6, thereby defining the fitting positions of the portions 6A and 6B to prevent an improper assembly.

As is shown in FIGS. 3 and 4, the second portion 6B has an ear portion 25 projecting from an outer peripheral surface thereof. A positioning pin 28 is provided on the ear portion 25 to project therefrom and is fitted into a positioning hole 27 provided in a combination switch case 26. The combination switch case 26 contains therein and supports preferably, but not necessarily, a turn signal switch, a lighting switch, a dimmer switch, a passing switch and the like, the case 26 secured to a stationary bracket 29 on the steering column 1 by a bolt 30.

The locking collar 14 is formed longer than the cylindrical mounting portion 7c of the rotor 7, and has a front end adapted to be secured in place by the boss 3a of the steering wheel 3 which is fitted over the serration shaft portion 2b.

A cancel cam 31 of the turn signal switch within the combination switch case 26 is attached to the locking collar 14 by a cir-clip 32. A groove 33 and a projection 34 are provided respectively in the locking collar 14 and on the cam 31 to engage each other, so that the cam 31 can be rotated along with the locking collar 14.

In an example of the preferred operation of the invention, before being mounted to the vehicle, the steering angle sensor 5 has the rotor 7 locked to the stator 6 in the predetermined rotational neutral position in the following manner: The stator 6 and the rotor 7 are rotated relative to each other, and when the rotor 7 reaches the predetermined rotational neutral position, the locking grooves $17_1$ to $17_3$ in the rotor 7 are aligned with the locking teeth $20_1$ to $20_3$ of the stator 6, respectively and brought into engagement with the locking teeth $20_1$ to $20_3$ by the resilient force of the locking spring 21. In this manner, the rotor 7 is locked to the stator 6 through the locking collar 14 in the predetermined rotational neutral position. At this time, if there is a deviation or error in the predetermined rotational neutral position of the rotor 7, the machine screws 22, 22 coupling the first and second portions 6A and 6B are loosened, and the portions 6A and 6B are slightly rotated relative to each other. Then, the machine screws 22, 22 are tightened again at a location at which the first pickup 10 produces a given neutral signal, thereby coupling the portions 6A and 6B.

In the automobile, prior to mounting of the steering wheel 3, the steering shaft 2 is retained in a predetermined rotational neutral position in which the front wheels are directed to a straight advancing direction. In such a condition, the steering angle sensor 5 is mounted together with the combination switch case 26 to the steering shaft 2 as shown in FIG. 3. The cylindrical mounting portion 7c of the rotor 7 is fitted over the sensor-mounting shaft portion 2a, and the positioning pin 28 of the stator 6 is fitted into the positioning hole 27 in the combination switch case 26. Thereafter, the combination switch case 26 is secured to the stationary bracket 29 through the bolt 30. In this way, the stator 6 is prevented from being rotated by the combination switch case 26 through the positioning pin 28. Even in this stage, the locking of the rotor 7 by the locking collar 14 is maintained.

Thereafter, when the boss 3a of the steering wheel 3 is fitted over the serration shaft portion 2b of the steering shaft 2 the nut 4 is threadedly mounted thereon as is shown in FIGS. 1 and 2. The locking collar 14 moves the rotor 7 toward the intermediate wall portion 7b while compressing the locking springs 21 by an urging force from the boss 3a while each of the locking grooves $17_1$ to $17_3$ and each of the locking teeth $20_1$ to $20_3$ are disengaged or moved away from each other. In this manner, the lock of the rotor 7 to the stator 6 is released, the inwardly-directed flange 19 of the rotor 7 is urged against a step between the sensor-mounting shaft portion 2a and the serration shaft portion 2b in the steering shaft 2 and the locking collar 14 is urged against the front end face of the boss 3a, all as a result of the resilient force of the locking spring 21. Thus, the rotor 7, in the rotational neutral position, is connected to the steering shaft 2 in the rotational neutral position. Consequently, when the steering shaft 2 is rotated by the steering wheel 3, a signal corresponding to a counterclockwise or clockwise rotational angle of the steering shaft 2 from the rotational neutral position, i.e., corresponding to a steering angle, can correctly be detected by or sensed by the second pickup 11.

Figure 8:
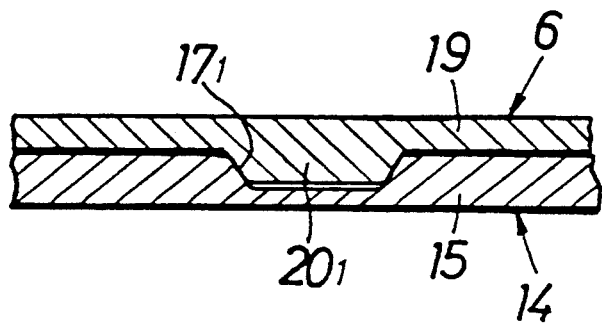
FIG. 8 illustrates a cross-sectional view showing a modification of a locking groove and a locking tooth in the steering angle sensor.

FIG. 8 illustrates a modification of the locking grooves $17_1$ to $17_3$ and the locking teeth $20_1$ to $20_3$. In this embodiment, each of the locking grooves $17_1$ to $17_3$ and each of the locking teeth $20_1$ to $20_3$ are formed in a trapezoidal shape in section.

According to this embodiment, before mounting the steering angle sensor 5 to the vehicle, when the rotor 7 and the stator 6 are rotated relative to each other to obtain a rotational neutral position of the rotor 7, the locking teeth $20_1$ to $20_3$ (each having a relatively wide area) can smoothly slide on an inclined flat surface of the locking collar 14, unless each of the locking grooves $17_1$ to $17_3$ and each of the locking teeth $20_1$ to $20_3$ are aligned with each other. Therefore, there is no fear that an operator may erroneously recognize that the rotor 7 has reached the neutral position.

Although there has been described what is at present considered to be preferred embodiments of the invention, it will be understood that various modifications and variations may be made therein, and it is intended to cover in the appended claims all such modifications as fall within the true spirit and scope of the invention.

We claim:
1. A steering angle sensor for an automobile, comprising:
   a stator supported on a steering column fixed to a vehicle body, and a rotor mounted to a steering shaft rotatably carried in said steering column,
   said stator having a pickup means provided thereon for detecting the rotational angle of said rotor from a predetermined rotational neutral position thereof, wherein
   said sensor further includes a locking means which is adapted to lock said rotor with respect to the vehicle body in a neutral position when a steering wheel is not mounted to the steering shaft, and is adapted, when the steering wheel is mounted to the steering shaft, automatically to disengage the lock of said rotor and to connect said rotor to said steering shaft.
2. The steering angle sensor of claim 1, wherein:
   said locking means comprises a plurality of locking pins and corresponding holes, one hole and one locking pin being a different matching size.
3. The steering angle sensor of claim 1, wherein:
   a plurality of permanent magnets are embedded in the outer peripheral surface of said rotor.
4. The steering angle sensor of claim 3, wherein:
   said pickup means detects the rotational angle by sensing said plurality of magnets.
5. The steering angle sensor of claim 3, wherein:
   said plurality of magnets are arranged such that the poles are alternately opposite.
6. The steering angles sensor of claim 1, wherein:
   said rotor is disengaged from the lock by the boss of said steering wheel pressing upon the resilient force of a locking spring.
7. The steering angle sensor of claim 1, wherein:
   said stator is divided into a first cylindrical portion and a second cylindrical portion, said first cylindrical portion includes a first pickup means, a second pickup means and an electronic circuit;
   said second cylindrical portion having locking teeth thereon; and
   said first cylindrical portion rotatably fitted over said second cylindrical block.
8. The steering angle sensor of claim 1, wherein:
   a corrugated locking spring biases said locking means into engagement until the boss of said steering wheel compresses said locking spring.
9. The steering angle sensor of claim 1, wherein:
   said pickup means comprises a first pickup means and a second pickup means;
   said first pickup means detects a particular magnet embedded in said rotor at a predetermined neutral position; and
   said second pickup means detects the clockwise or counterclockwise rotation of said rotor.
10. A steering angle sensor for an automobile, comprising:
    a stator supported on a steering column of an automobile, and a rotor mounted to a steering shaft rotatably carried in said steering column,
    said stator having a pickup means provided thereon for detecting the rotational angle of said rotor from a predetermined rotational neutral position thereof, wherein
    said sensor further includes a locking member which is mounted between said stator and said rotor for movement between a locking position in which said rotor is locked to said stator in the predetermined rotational neutral position and a lock-releasing position in which the rotation of said rotor is permitted, said locking member being biased toward said locking position by a spring and arranged to move to said lock-releasing position and to connect said rotor to said steering shaft by mounting the steering wheel to the steering shaft.

11. A method of assembling a steering assembly for an automobile having a steering angle sensor, comprising:
providing a steering column fixed to a vehicle body with a stator thereon, said stator including at least one pickup means for detecting the rotational angle of a rotor from a predetermined neutral position;
providing said rotor on a steering shaft rotatably secured by said steering column;
providing locking means for engaging said rotor in said neutral position when said steering shaft is absent a steering wheel; and
providing a steering wheel on said steering shaft and securing said steering wheel thereto, said securing of said steering wheel disengaging said locking means and securing said rotor to said steering shaft.

12. A steering angle sensor which eliminates alignment errors of the neutral rotor position and the neutral steering wheel position during assembly of a vehicle, said sensor comprising:
a stator supported on a steering column having at least one pickup means for detecting rotational movement of said rotor;
a rotor mounted to a rotatable steering shaft which is carried by said steering column, said rotor having a locking means non-rotatably, slidably connected thereto, said locking means engaging said rotor in a predetermined rotational alignment;
a steering wheel slidably received upon said steering shaft in a predetermined neutral position and exerting a force upon said locking means, said locking means disengaging and causing said rotor to be connected to said steering shaft in alignment with said steering wheel neutral position.

13. The steering angle sensor of claim 12, wherein:
said locking means comprises at least one locking groove and at least one locking tooth on said stator and a locking collar biased into an engagement position by a locking spring.

14. The steering angle sensor of claim 13, wherein:
said locking spring comprises a corrugated ring member.

15. The steering angle sensor of claim 14, wherein:
said stator provided as a first cylindrical portion and a second cylindrical portion rotatably fitted together;
said first cylindrical portion having said at least one pickup means and an electronic circuit;
said second cylindrical portion having said at least one locking tooth; and
said first and second portions rotatable to a predetermined neutral position such that said at least one pickup means produces a neutral position signal of said rotor.

16. The steering angle sensor of claim 15, wherein:
said at least one pickup means comprises a first pickup means and a second pickup means;
said first pickup means produces a signal indicative of the neutral position of said rotor;
said second pickup means produces a signal indicative of the rotational angle of said rotor.

17. The steering angle sensor of claim 16, wherein:
said rotor includes a plurality of magnets embedded in an outer peripheral surface, said magnets arranged in circumferential manner with said magnets magnetic poles alternately reversed.

18. The steering angle sensor of claim 17, wherein:
said first pickup means produces a signal in response to the location of a particular one of said plurality of magnets; and
said second pickup means produces a signal in response to the passage of said plurality of magnets.

19. The steering angle sensor of claim 18, wherein:
said rotor includes said at least one locking groove.

* * * * *